(12) United States Patent
Shigetaka

(10) Patent No.: US 10,430,006 B2
(45) Date of Patent: Oct. 1, 2019

(54) INPUT DEVICE AND METHOD FOR DRIVING INPUT DEVICE

(71) Applicant: ALPS ALPINE CO., LTD., Tokyo (JP)

(72) Inventor: Hiroshi Shigetaka, Miyagi-ken (JP)

(73) Assignee: ALPS ALPINE CO., LTD., Tokyo (JP)

(*) Notice: Subject to any disclaimer, the term of this patent is extended or adjusted under 35 U.S.C. 154(b) by 15 days.

(21) Appl. No.: 15/946,927

(22) Filed: Apr. 6, 2018

(65) Prior Publication Data

US 2018/0239462 A1    Aug. 23, 2018

Related U.S. Application Data

(63) Continuation of application No. PCT/JP2016/082835, filed on Nov. 4, 2016.

(30) Foreign Application Priority Data

Nov. 11, 2015 (JP) ................................. 2015-221252

(51) Int. Cl.
*G06F 3/041* (2006.01)
*G06F 3/044* (2006.01)
(Continued)

(52) U.S. Cl.
CPC .............. *G06F 3/044* (2013.01); *G01L 1/144* (2013.01); *G01L 1/225* (2013.01); *G06F 3/0416* (2013.01);
(Continued)

(58) Field of Classification Search
CPC ......... G01L 1/14; G06F 3/0416; G06F 3/044; G06F 3/0414; G06F 2203/04105
See application file for complete search history.

(56) References Cited

U.S. PATENT DOCUMENTS

2013/0321005 A1* 12/2013 Hargreaves ............. G06F 3/044
324/679
2014/0218334 A1    8/2014 Shibata et al.

FOREIGN PATENT DOCUMENTS

| JP | 06-314156 A | 11/1994 |
| JP | 2011-134259 A | 7/2011 |
| WO | WO 2012-176748 A1 | 12/2012 |

OTHER PUBLICATIONS

International Search Report for corresponding International Patent Application No. PCT/JP2016/082835, dated Dec. 6, 2016, 1 page.

* cited by examiner

*Primary Examiner* — Dennis P Joseph
(74) *Attorney, Agent, or Firm* — Brinks Gilson & Lione

(57) ABSTRACT

An input device includes a voltage divider circuit that includes a resistive sensor whose resistance changes in accordance with a change in pressure of a pressing operation and at least one resistor device and that, upon receiving driving voltage, generates a divider voltage according to the resistance of the resistive sensor device, a first driving circuit that alternately supplies, to the voltage divider circuit at certain time intervals, a first driving voltage and a second driving voltage for generating different divider voltages, a capacitor whose charge changes in accordance with a change in the divider voltage, and a first charge detection circuit that detects an amount of change in the charge of the capacitor at a time when the driving voltage changes from the first driving voltage to the second driving voltage and when the driving voltage changes from the second driving voltage to the first driving voltage.

6 Claims, 5 Drawing Sheets

(51) Int. Cl.
 *G01L 1/14* (2006.01)
 *G01L 1/22* (2006.01)
(52) U.S. Cl.
 CPC .. *G06F 3/0414* (2013.01); *G06F 2203/04105* (2013.01)

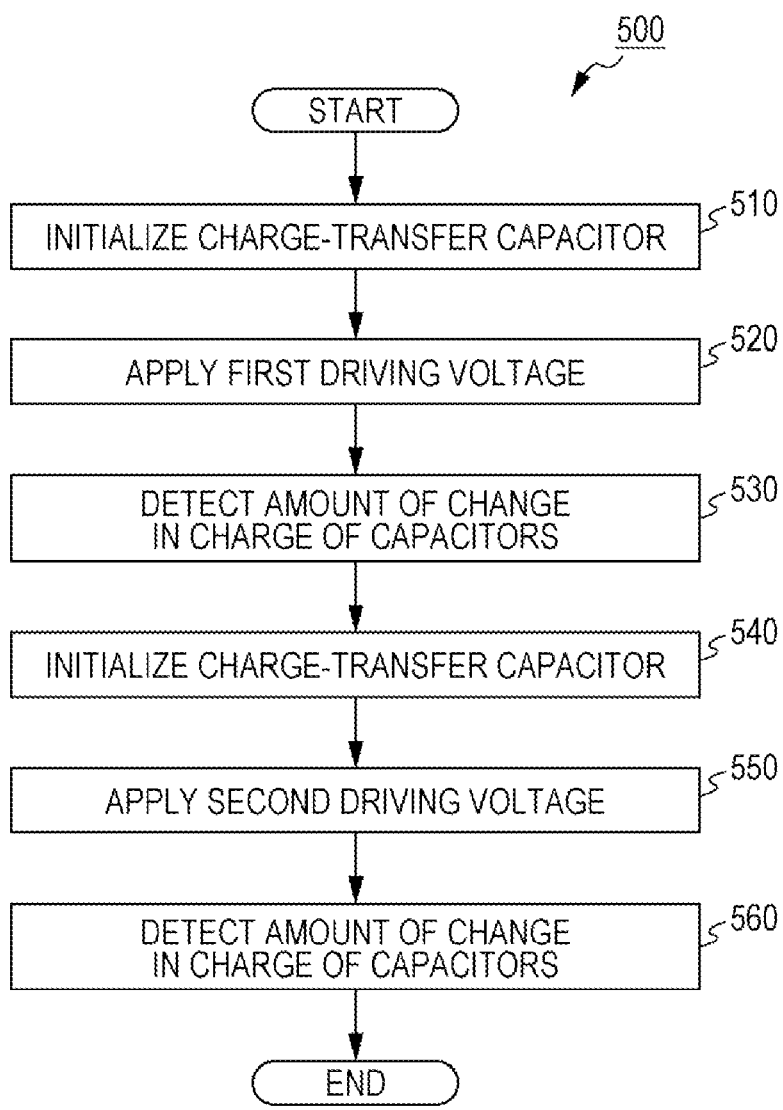

INPUT DEVICE AND METHOD FOR DRIVING INPUT DEVICE

CLAIM OF PRIORITY

This application is a Continuation of International Application No. PCT/JP2016/082835 filed on Nov. 4, 2016, which claims benefit of Japanese Patent Application No. 2015-221252 filed on Nov. 11, 2015. The entire contents of each application noted above are hereby incorporated by reference in their entireties.

BACKGROUND

1. Field of the Disclosure

The present disclosure relates to an input device and a method for driving the input device.

2. Description of the Related Art

Japanese Unexamined Patent Application Publication No. 6-314156 discloses an input device that includes a sensing device whose resistance changes in accordance with changes in pressure and a charge accumulation unit that accumulates charge upon application of voltage and that measures pressure on the basis of changes in current flowing through the charge accumulation unit, the changes in current depending on the resistance of the sensing device.

However, with the input device disclosed in Japanese Unexamined Patent Application Publication No. 6-314156, the charge of the charge accumulation unit needs to be discharged after the charge accumulation unit accumulates the charge, and it is difficult to perform measurement during the discharging. A measurement period, therefore, is undesirably long, and it takes time to complete each measurement operation.

SUMMARY

An input device according to a first aspect includes a voltage divider circuit that includes a resistive sensor device whose resistance changes in accordance with a change in pressure of a pressing operation and at least one resistor device. Upon receiving a driving voltage, the voltage divider circuit generates a divider voltage according to the resistance of the resistive sensor device, a first driving circuit that alternately supplies, to the voltage divider circuit at certain time intervals. A first driving voltage and a second driving voltage generate different divider voltages. A capacitor in the input device has a charge that changes in accordance with a change in the divider voltage. A first charge detection circuit detects an amount of change in the charge of the capacitor at a time when the driving voltage changes from the first driving voltage to the second driving voltage and when the driving voltage changes from the second driving voltage to the first driving voltage.

With this configuration, since the first and second driving voltages are alternately supplied to the voltage divider circuit at certain time intervals, there is no need to provide a discharging period for the capacitor. A measurement period, therefore, becomes shorter and measurement can be completed more promptly than in the example of the related art.

A second aspect relates to a method for driving an input device including a voltage divider circuit that includes a resistive sensor device whose resistance changes in accordance with a change in pressure of a pressing operation and at least one resistor device. Upon receiving driving voltage, the voltage divider circuit generates a divider voltage according to the resistance of the resistive sensor device and a capacitor whose charge changes in accordance with a change in the divider voltage. The method includes changing the driving voltage from a first driving voltage to a second driving voltage, detecting an amount of change in the charge of the capacitor when the driving voltage changes from the first driving voltage to the second driving voltage, changing the driving voltage from the second driving voltage to the first driving voltage, and detecting an amount of change in the charge of the capacitor when the driving voltage changes from the second driving voltage to the first driving voltage.

With this configuration, since the first and second driving voltages are alternately supplied to the voltage divider circuit at certain time intervals, there is no need to provide a discharging period for the capacitor. A measurement period, therefore, becomes shorter and measurement can be completed more promptly than in the example of the related art.

BRIEF DESCRIPTION OF THE DRAWINGS

FIG. 4 is a flowchart illustrating a method for driving the input device illustrated in FIG. 1; FIG. 5A illustrates a control signal output from a control unit in order to control a charge initialization circuit; FIG. 5B illustrates a potential supplied to a first node of a voltage divider circuit; FIG. 5C illustrates a potential supplied to a second node of the voltage divider circuit; and FIG. 5D illustrates an example of the amount of change in charge accumulated in capacitors according to changes in driving voltage.

DESCRIPTION OF THE EXEMPLARY EMBODIMENTS

Overall Configuration

Figure 1:
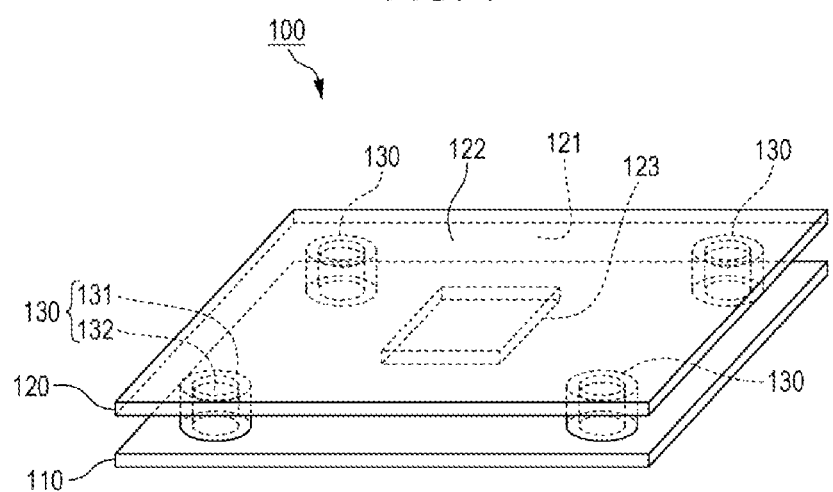
FIG. 1 is a diagram illustrating the configuration of an input device according to a first embodiment of the present invention.

An input device 100 according to an embodiment of the present invention will be described hereinafter. As illustrated in FIG. 1, the input device 100 includes a base 110, a board 120, and four pillars 130. The input device 100 is mounted on a laptop computer, for example, and outputs, to a central processing unit (CPU), a signal according to a touch operation performed by a user. Alternatively, the input device 100 may be used as a device that outputs, to a control device installed in a vehicle, a signal according to a touch operation performed by a driver of the vehicle. The input device 100 includes a sensor whose capacitance changes as an object such as a finger approaches and obtains coordinates of a position of the object that approaches the board 120 on the basis of a result of detection. The input device 100 also includes a sensor whose resistance changes depending on pressure and measures the pressure of a pressing operation performed on the board 120 on the basis of a result of detection.

The flat base 110 is fixed to, for example, a body of the laptop computer. The flat rectangular board 120 is arranged parallel to the base 110 and includes an inner surface 121 that faces the base 110 and an outer surface 122 that faces away from the base 110. On the outer surface 122, as described above, the sensor for detecting, on the basis of a change in capacitance, an operation performed by an operation body such as a finger is arranged. On the inner surface 121, a semiconductor integrated circuit chip 123 necessary to operate the input device 100 and a circuit component, which is not illustrated, including various circuit elements are mounted, and an electrically conductive pattern connecting these components is formed.

The pillars 130 are arranged at four corners of the board 120. The pillars 130 each include a support 131 and a resistive sensor device 132. The support 131 is a cylindrical member that elastically supports the board 120 on the base 110. The resistive sensor device 132 is a device whose resistance changes in accordance with a change in pressure caused by a pressing operation performed on the board 120.

The resistive sensor device 132 includes, for example, a conductive elastic member that elastically changes a shape thereof in accordance with a pressing operation performed on the board 120 and that has a relatively low resistance and a conductive route that is provided in contact with the conductive elastic member and that has a relatively high resistance. The conductive elastic member, for example, is fixed to the support 131, and the conductive route is formed on the inner surface 121 of the board 120 as a high-resistance electrically conductive pattern. As the board 120 is pressed against the base 110 and becomes closer to the base 110, an area of the inner surface 121 of the board 120 in which the conductive route and the conductive elastic member contact increases, and resistance to current flowing through the conductive route decreases. As the board 120 is released from the base 110 and becomes farther from the base 110 due to the elasticity of the support 131, the area of the inner surface 121 of the board 120 in which the conductive route and the conductive elastic member contact decreases, and the resistance to the current flowing through the conductive route increases. That is, a change in pressure applied to the board 120 is detected as a change in the resistance to the current flowing through the conductive route.

Control System

Figure 2:
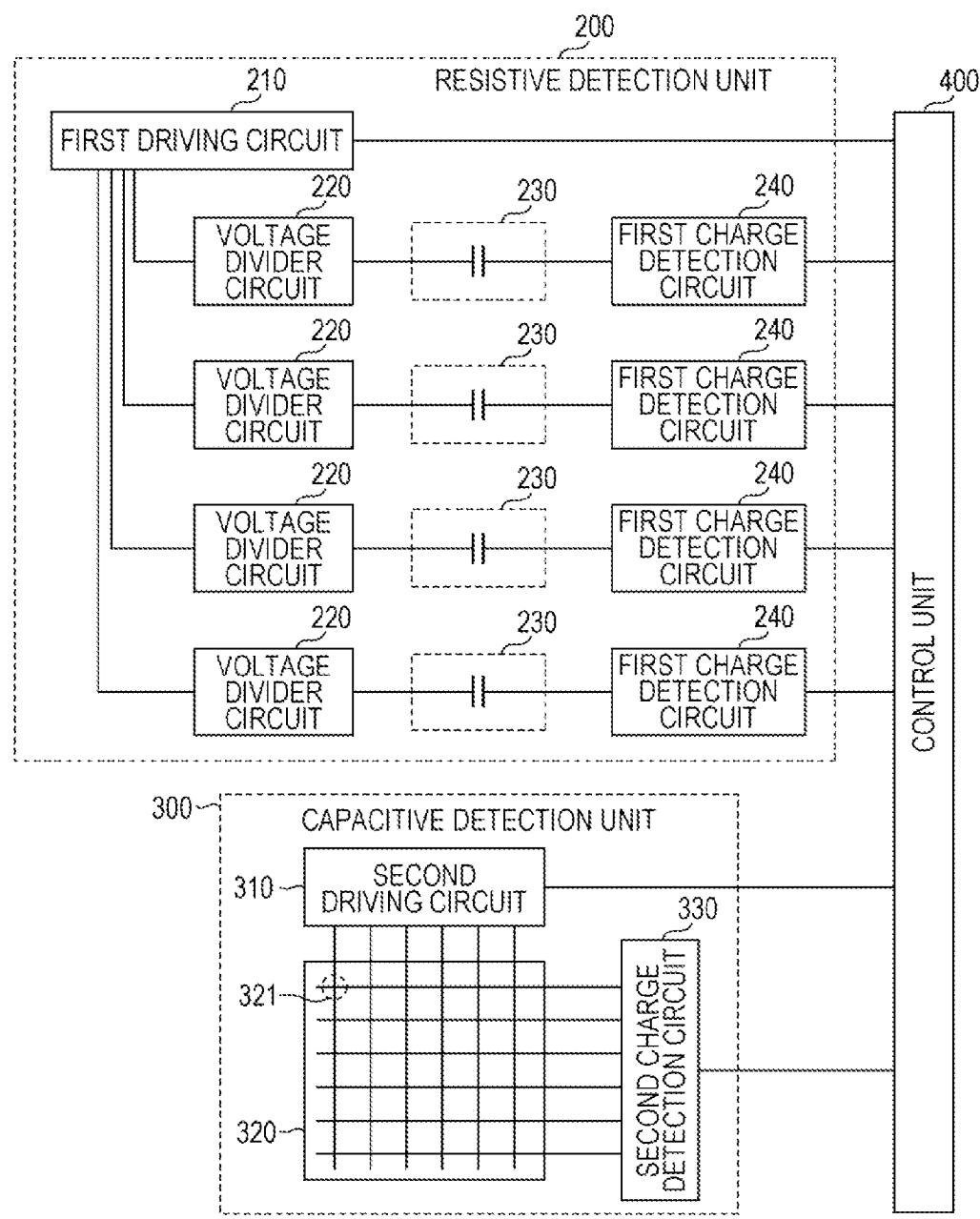
FIG. 2 is a block diagram illustrating an example of the circuit configuration of the input device illustrated in FIG. 1.

FIG. 2 is a block diagram illustrating an example of the circuit configuration of the input device 100 illustrated in FIG. 1. As illustrated in FIG. 2, for example, the input device 100 illustrated in FIG. 1 includes a resistive detection unit 200, a capacitive detection unit 300, and a control unit 400. The resistive detection unit 200 and the capacitive detection unit 300 are theoretical concepts for the sake of description and need not be formed on physically separate semiconductor integrated circuit chips.

Resistive Detection Unit 200

The resistive detection unit 200 includes a first driving circuit 210, four voltage divider circuits 220, four capacitors 230, and four first charge detection circuits 240. Each of the pillars 130 illustrated in FIG. 1 is provided with a group of circuits including one of the voltage divider circuits 220, one of the capacitors 230, and one of the first charge detection circuits 240 illustrated in FIG. 2. The number of groups of circuits may be smaller or larger than four.

The first driving circuit 210 supplies driving voltage to the voltage divider circuits 220 and switches the driving voltage applied to the voltage divider circuits 220 on the basis of an input from the control unit 400. The first driving circuit 210 alternately supplies, to the voltage divider circuits 220 at certain time intervals, two different patterns of driving voltage (a first driving voltage and a second driving voltage), for example, for generating different divider voltages.

The voltage divider circuits 220 each include one of the resistive sensor devices 132 illustrated in FIG. 1 and at least one resistor device. Upon receiving the driving voltage from the first driving circuit 210, each of the voltage divider circuits 220 generates a divider voltage according to the resistance of the resistive sensor device 132. Since the resistance of the resistive sensor device 132 changes in accordance with the pressure applied to the board 120, the divider voltage of each of the voltage divider circuits 220 also changes in accordance with the pressure applied to the board 120.

The capacitors 230 accumulate charge according to changes in the divider voltages output from the voltage divider circuits 220. As the divider voltages from the voltage divider circuits 220 change, the amount of charge of the capacitors 230 changes.

The first charge detection circuits 240 detect the amount of change in the charge of the capacitors 230 at a time when the driving voltages of the first driving circuit 210 have changed, and output results of the detection to the control unit 400. That is, the first charge detection circuits 240 detect the amount of change in the charge of the capacitors 230 at a time when the driving voltage has changed from one of the two patterns (first driving voltage) to the other pattern (second driving voltage) and when the driving voltage has changed from the other pattern (second driving voltage) to the one of the two patterns (first driving voltage).

Figure 3:
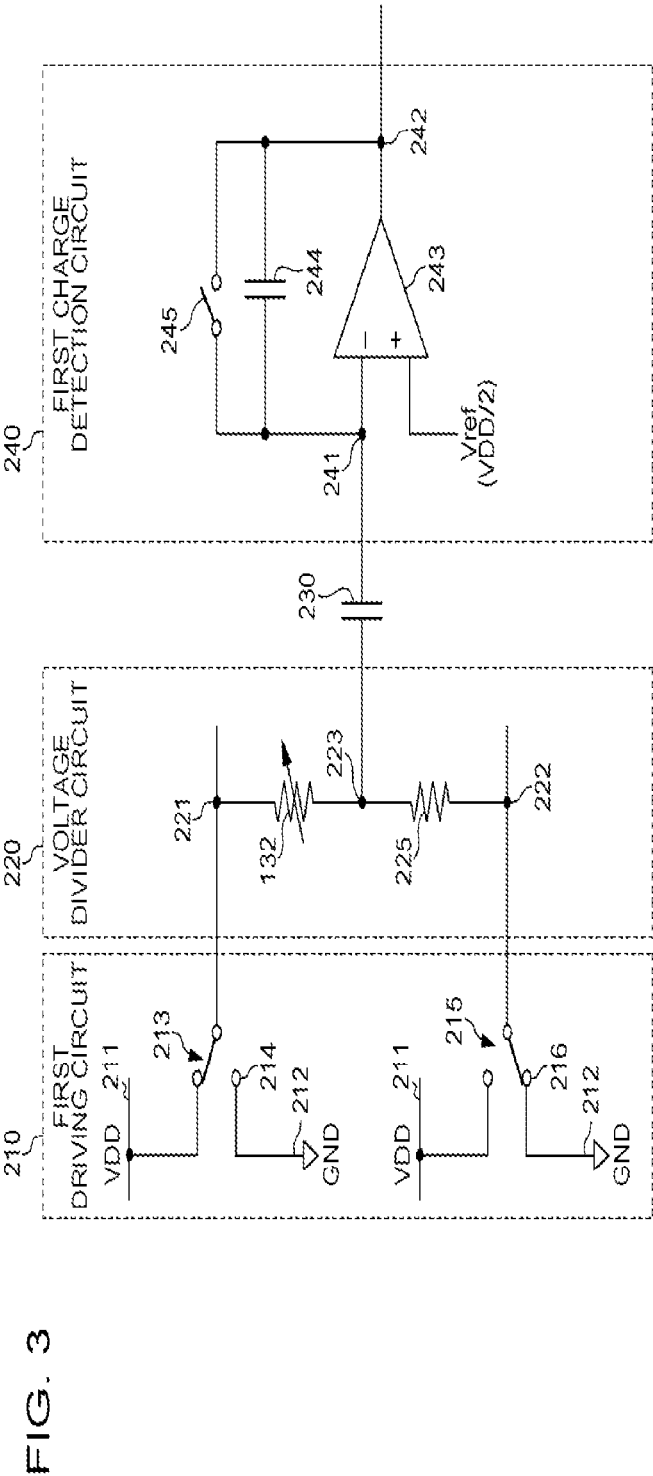
FIG. 3 is a partial circuit diagram of a resistive detection unit illustrated in FIG. 2.

FIG. 3 is a partial circuit diagram of the resistive detection unit 200. FIG. 3 illustrates a specific example of a group of circuits including one of the voltage divider circuits 220, one of the capacitors 230, and one of the first charge detection circuits 240 illustrated in FIG. 2.

The voltage divider circuits 220 each include a first node 221 and a second node 222 to which the driving voltage is supplied from the first driving circuit 210 and a detection node 223 to which the divider voltage is output. The voltage divider circuits 220 each also include the resistive sensor device 132 as a variable resistor arranged between the first node 221 and the detection node 223 and a resistor device 225 arranged between the detection node 223 and the second node 222. The resistor device 225 has a fixed resistance.

The first driving circuit 210 connects, on the basis of an input from the control unit 400, either the first node 221 or the second node 222 to a power supply line 211 having a power supply potential (VDD) and connects the other of the first node 221 and the second node 222 to ground 212 having a ground potential (GND). That is, when supplying the one of the two driving voltage patterns (first driving voltage) to the voltage divider circuits 220, the first driving circuit 210 connects the first node 221 to the power supply line 211 and the second node 222 to the ground 212. When supplying the other driving voltage pattern (second driving voltage) to the voltage divider circuits 220, the first driving circuit 210 connects the first node 221 to the ground 212 and the second node 222 to the power supply line 211.

In the example illustrated in FIG. 3, the first driving circuit 210 includes switching circuits 213 and 215. The switching circuit 213 connects one of the power supply line 211 and the ground 212 to the first node 221 on the basis of an input from the control unit 400. The switching circuit 215 connects the other of the power supply line 211 and the ground 212 to the second node 222 on the basis of an input from the control unit 400.

The first charge detection circuits 240 each include an input node 241, an output node 242, an amplifier circuit 243, a charge-transfer capacitor 244, and a charge initialization circuit 245.

An end of each of the capacitors 230 is connected to the detection node 223 of one of the voltage divider circuits 220 and, another end is connected to the input node 241 of one of the first charge detection circuits 240.

The charge-transfer capacitor 244 accumulates charge transferred from the corresponding capacitor 230 through the input node 241. An end of the charge-transfer capacitor 244 is connected to the input node 241 and another end is connected to the output node 242.

The amplifier circuit 243 is, for example, an operational amplifier. An inverting input terminal of the amplifier circuit 243 is connected to the input node 241, and a reference voltage (Vref=VDD/2) is applied to a non-inverting input terminal. An output terminal of the amplifier circuit 243 is connected to the output node 242. The amplifier circuit 243 amplifies a difference between a voltage at the input node 241 and the reference voltage Vref and outputs a resultant voltage to the charge-transfer capacitor 244. Because the gain of the amplifier circuit 243 is sufficiently high, the voltage at the input node 241 becomes substantially the same as the reference voltage Vref after the output of the amplifier circuit 243 is negatively fed back to the input node 241 through the charge-transfer capacitor 244.

The charge initialization circuit 245 initializes, on the basis of an input from the control unit 400, the charge accumulated in the charge-transfer capacitor 244 and includes, as illustrated in FIG. 3, for example, a switching circuit connected in parallel with the charge-transfer capacitor 244. When the charge initialization circuit 245 turns on, the input node 241 and the output node 242 are short-circuited, and the charge of the charge-transfer capacitor 244 is discharged. When the charge initialization circuit 245 turns off, the short circuit between the input node 241 and the output node 242 is canceled, and charge can be accumulated in the charge-transfer capacitor 244.

After the amplifier circuit 243 outputs a voltage according to charge transferred from the capacitor 230 to the charge-transfer capacitor 244 in accordance with a change in the driving voltage of the first driving circuit 210, the charge initialization circuit 245 initializes the charge accumulated in the charge-transfer capacitor 244 before the driving voltage of the first driving circuit 210 changes again.

As described above, since the voltage at the output node 242 is adjusted such that the voltage at the input node 241 and the reference voltage Vref become substantially the same, a change in the divider voltage at the detection node 223 directly becomes a change in the voltage of the corresponding capacitor 230. The amount of change in the charge accumulated in the capacitor 230 is proportional to the change in the divider voltage. In addition, when the switching circuit of the charge initialization circuit 245 is off, the input node 241 has high impedance, and the amount of change in the charge of the charge-transfer capacitor 244 and the amount of change in the charge accumulated in the capacitors 230 become substantially the same. By measuring the voltage at the output node 242, the amount of change in the charge of the charge-transfer capacitor 244 is detected, and the amount of change in the charge of the capacitors 230 is accordingly detected. Since the amount of change in the charge of the capacitors 230 is proportional to the change in the divider voltage of the voltage divider circuits 220, the voltage at the output node 242 of the first charge detection circuit 240 depends on the resistance of the resistive sensor device 132, that is, the pressure applied to the board 120.

Capacitive Detection Unit 300

As illustrated in FIG. 2, the capacitive detection unit 300 includes a second driving circuit 310, a capacitive sensor unit 320, and a second charge detection circuit 330.

The capacitive sensor unit 320 includes a plurality of capacitive sensor devices 321. The capacitive sensor devices 321 are arranged on the outer surface 122 of the board 120 at different positions, and the capacitance thereof changes as an object approaches. In the example illustrated in FIG. 2, the capacitive sensor unit 320 includes a plurality of driving electrodes arranged on the outer surface 122 of the board 120 such that the driving electrodes do not intersect with one another and a plurality of detection electrodes arranged on the outer surface 122 of the board 120 such that the driving electrodes do not intersect with one another. A layer in which the driving electrodes are arranged is different from a layer in which the detection electrodes are arranged. The driving electrodes and the detection electrodes perpendicularly intersect with each other in different layers. The capacitive sensor devices 321 are formed in an area in which the driving electrodes and the detection electrodes closely intersect with each other.

The second driving circuit 310 is connected to the capacitive sensor devices 321 through the driving electrodes of the capacitive sensor unit 320 and supplies driving voltage to the capacitive sensor devices 321 on the basis of an input from the control unit 400.

The second charge detection circuit 330 is connected to the capacitive sensor devices 321 through the detection electrodes of the capacitive sensor unit 320 and detects charge accumulated in the capacitive sensor devices 321 as a result of the supply of driving voltage from the second driving circuit 310.

The control unit 400 is a circuit that controls the overall operation of the input device 100 and includes, for example, a computer that performs processing in accordance with instruction codes of programs stored in a memory and a dedicated logic circuit. The control unit 400 performs a process for controlling the first driving circuit 210 in such a way as to periodically change the driving voltage supplied to the voltage divider circuits 220, a process for obtaining, with the first charge detection circuits 240, results of detection of the amount of change in the charge of the capacitors 230 as a result of a change in the driving voltage, a process for initializing the charge of the charge-transfer capacitor 244 in accordance with the period of the driving voltage using the charge initialization circuit 245, and the like. The control unit 400 also performs a process for controlling the driving voltages supplied to the capacitive sensor devices 321 from the second driving circuit 310, a process for obtaining, with the second driving circuit 310, results of detection of the amount of change in the charge of the capacitive sensor devices 321, a process for calculating coordinates of an approaching object on the basis of the amount of change in charge detected by the second charge detection circuit 330, and the like.

As illustrated in FIG. 2, the first charge detection circuits 240 are connected to the capacitors 230, and the second charge detection circuit 330 is connected to the capacitive sensor devices 321 including the capacitors. Both the first charge detection circuits 240 and the second charge detection circuit 330 detect charge accumulated in the capacitors. Since the number of circuit elements shared in common is larger than when a component other than the capacitors 230 is used to detect changes in the resistance of the resistive detection unit 200, the circuit configuration is simplified.

In addition, because the first driving circuit 210, the first charge detection circuits 240, the second driving circuit 310, and the second charge detection circuit 330 are all integrated on the image information storage section 123, the circuit configuration is more simplified, and the number of circuit components mounted on the board 120 is reduced.

Driving Method

A flowchart 500 of FIG. 4 illustrates a method for driving the resistive detection unit 200 illustrated in FIG. 2 among driving methods used by the input device 100 illustrated in FIG. 1. The flowchart 500 of FIG. 4 illustrates an operation performed over one period of the driving voltage supplied to the voltage divider circuits 220 from the first driving circuit 210.

Figure 5A:
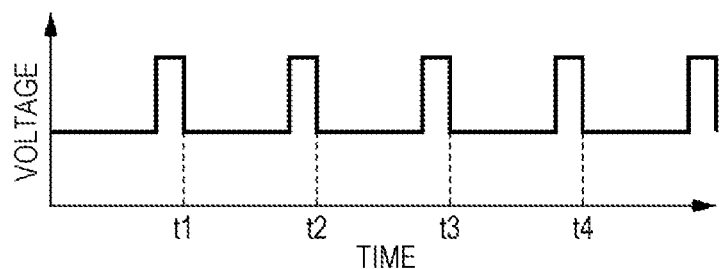
FIGS. 5A to 5D are graphs illustrating signals relating to the operation of the resistive detection unit illustrated in FIG. 2.
Figure 5B:
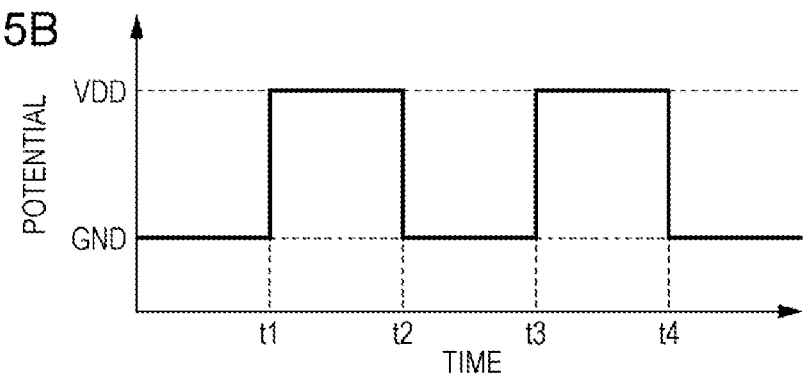
Figure 5C:
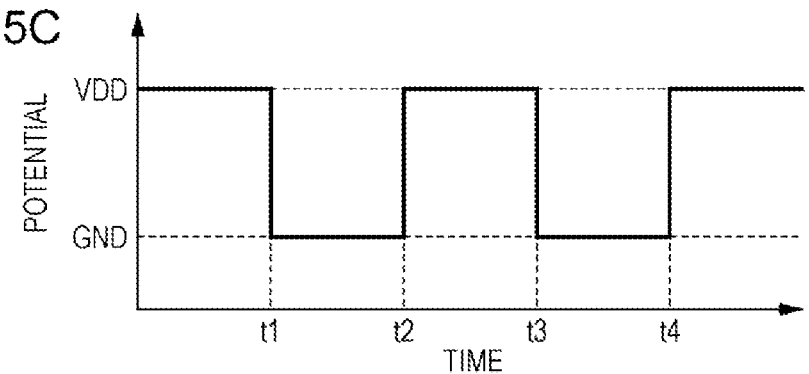
Figure 5D:
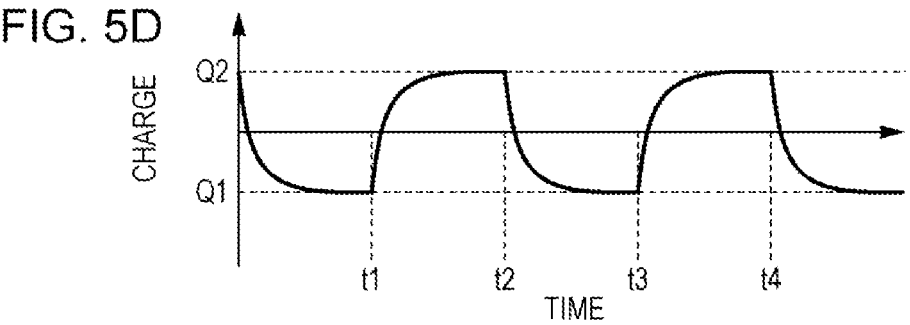

FIGS. 5A to 5D illustrate signals relating to the driving of the resistive detection unit 200. FIG. 5A illustrates a control signal output from the control unit 400 in order to control the charge initialization circuit 245 illustrated in FIG. 3. FIG. 5B illustrates a potential supplied to the first node 221 illustrated in FIG. 3. FIG. 5C illustrates a potential supplied to the second node 222 illustrated in FIG. 3. FIG. 5D illustrates an example of the amount of change in the charge accumulated in the capacitors 230 illustrated in FIG. 3. Since the charge accumulated in the capacitors 230 varies depending on the resistance of the resistive sensor device 132 illustrated in FIG. 1, the charge does not necessarily change as illustrated in FIG. 5D. If the reference voltage Vref is half (VDD/2) the power supply voltage VDD, for example, the amount of change becomes smaller as the resistances of the resistive sensor device 132 and the voltage detector 225 become closer to each other.

Times t1 to t4 illustrated in FIGS. 5A to 5D indicate timings in a time window over which the driving method is performed. The length of time from the time t1 to the time t2 is the same as that from the time t2 to the time t3. The driving is periodically performed with a period of time from the time t1 to the time t3 counted as one period. That is, in a period of time from the time t3 to the time t4, the same operation as in a period of time from the time t1 to the time t2 is performed. One period, which lasts from the time t1 to the time t3, will be described hereinafter.

First, in step 510 illustrated in FIG. 4, the charge initialization circuit 245 initializes the charge accumulated in the charge-transfer capacitor 244 illustrated in FIG. 3. More specifically, the charge initialization circuit 245 turns on immediately before the time t1 illustrated in FIG. 5A and remains on until the time t1. When the charge initialization circuit 245 illustrated in FIG. 3 turns on, both ends of the charge-transfer capacitor 244 are short-circuited, and the charge of the charge-transfer capacitor 244 is discharged. The charge initialization circuit 245 turns off at the time t1 and remains off. When the charge initialization circuit 245 turns off, the short circuit of the charge-transfer capacitor 244 is canceled, and charge can be accumulated in the charge-transfer capacitor 244.

Next, in step 520 illustrated in FIG. 4, the first driving circuit 210 changes the driving voltage between the first node 221 and the second node 222 from the second driving voltage to the first driving voltage. More specifically, when the first node 221 illustrated in FIG. 3 is disconnected from the ground 212 and connected to the power supply line 211 at the time t1 illustrated in FIG. 5B, the potential of the first node 221 is switched from the ground potential (GND) to the power supply potential (VDD). Furthermore, when the second node 222 illustrated in FIG. 3 is disconnected from the power supply line 211 and connected to the ground 212 at the time t1 illustrated in FIG. 5C, the potential of the second node 222 is switched from the power supply potential (VDD) to the ground potential (GND).

Next, in step 530 illustrated in FIG. 4, the first charge detection circuits 240 detects the amount of change in the charge of the capacitors 230.

The resistance of the resistive sensor device 132 depends on the pressure applied to the board 120 (FIG. 1). The divider voltage at the detection node 223 depends on the resistance of the resistive sensor device 132 regardless of whether the driving voltage of the first driving circuit 210 is the first driving voltage or the second driving voltage. A change in the divider voltage when the driving voltage changes from the second driving voltage to the first driving voltage at the time t1, therefore, depends on the resistance of the resistive sensor device 132, that is, the pressure applied to the board 120. Since the voltage at the input node 241 of the first charge detection circuits 240 is kept at the reference voltage Vref, a change in the divider voltage is directly reflected by a change in the voltage of the capacitors 230, and the amount of change in the charge accumulated in the capacitors 230 becomes proportional to the change in the divider voltage. In the example illustrated in FIG. 5D, the charge of the capacitors 230 changes from Q1 to Q2.

When the charge initialization circuit 245 is off, the input node 241 has high impedance against the ground, and there is no movement of charge at the input node 241. The amount of change in the charge accumulated in the capacitors 230, therefore, becomes substantially the same as the amount of change in the charge accumulated in the charge-transfer capacitor 244. Since the charge of the charge-transfer capacitor 244 has been discharged and become zero before the driving voltage changes from the second driving voltage to the first driving voltage, the charge accumulated in the charge-transfer capacitor 244 after the driving voltage changes becomes the same as a change (Q2−Q1) in the charge of the capacitors 230 and becomes proportional to the change in the divider voltage. The voltage at the output node 242 of the first charge detection circuits 240, therefore, depends on the pressure applied to the board 120.

After the first charge detection circuits 240 outputs voltages according to the amount of change in the charge of the capacitors 230, the control unit 400 converts the voltages into digital values using an analog-to-digital (A/D) converter, which is not illustrated, and obtains the digital values as measurement data according to the pressure applied to the board 120.

Next, in step 540 illustrated in FIG. 4, the charge initialization circuit 245 initializes the charge accumulated in the charge-transfer capacitor 244 illustrated in FIG. 3. More specifically, the charge initialization circuit 245 remains off until the detection of charge performed by the first charge detection circuits 240 and the obtaining of measurement data performed by the control unit 400 are completed. The charge initialization circuit 245 then turns on immediately before the time t2 illustrated in FIG. 5A and remains on until the time t2. When the charge initialization circuit 245 turns on, the charge of the charge-transfer capacitor 244 is discharged. The charge initialization circuit 245 turns off at the time t2 and remains off. After the charge initialization circuit 245 turns off, charge can be accumulated in the charge-transfer capacitor 244.

Next, in step 550 illustrated in FIG. 4, the first driving circuit 210 changes the driving voltage between the first node 221 and the second node 222 illustrated in FIG. 3 from the first driving voltage to the second driving voltage. More specifically, when the first node 221 illustrated in FIG. 3 is disconnected from the power supply line 211 and connected to the ground 212 at the time t2 illustrated in FIG. 5B, the potential of the first node 221 switches from the power supply potential (VDD) to the ground potential (GND). Furthermore, when the second node 222 illustrated in FIG. 3 is disconnected from the ground 212 and connected to the power supply line 211 at the time t2 illustrated in FIG. 5C, the potential of the second node 222 switches from the ground potential (GND) to the power supply potential (VDD).

Next, in step 560 illustrated in FIG. 4, the first charge detection circuits 240 detects the amount of change in the charge of the capacitors 230.

The change in the divider voltage when the driving voltage changes from the first driving voltage to the second driving voltage at the time t2 depends on the resistance of the resistive sensor device 132, that is, the pressure applied to the board 120. The amount of change in the charge accumulated in the capacitors 230 is proportional to the amount of change in the divider voltage. In the example illustrated in FIG. 5D, the amount of charge of the capacitors 230 changes from Q2 to Q1. An amount of charge substantially the same as the amount of change (Q1–Q2) in the charge of the capacitors 230 is accumulated in the charge-transfer capacitor 244. The voltage at the output node 242 of the first charge detection circuits 240, therefore, depends on the pressure applied to the board 120. After the first charge detection circuits 240 outputs voltages according to the amount of change in the charge of the capacitors 230, the control unit 400 converts the voltages into digital values using the A/D converter, which is not illustrated, and obtains the digital values as measurement data according to the pressure applied to the board 120.

After the time t3 illustrated in FIGS. 5A to 5D, the same operation as in the period of time from the time t1 to the time t3 is repeated.

Since the first driving voltage in step 520 illustrated in FIG. 4 and the second driving voltage in step 550 have opposite polarities, the voltage at the detection node 223 periodically changes even if the resistance of the resistive sensor device 132 remains the same.

With the input device 100 according to the present embodiment, the first and second driving voltages are alternately supplied to the voltage divider circuits 220 at certain time intervals, and there is no need to provide a discharge period for a capacitor 230 that does not contribute to measurement. A measurement period, therefore, becomes shorter and measurement can be completed more promptly than in the example of the related art.

In addition, with the input device 100 according to the present embodiment, the power supply voltage generated between the power supply line 211 and the ground 212 is used as driving voltage, and driving voltages whose polarities are different from each other are alternately generated by switching the connection between the first node 221, the second node 222, the power supply line 211, and the ground 212. As a result, the polarity of the driving voltage can be reversed with a simple configuration. By reversing the polarity of the driving voltage, charging of the capacitors 230 is performed at the same time as a prior discharging operation, and measurement can be completed more promptly than when a period in which only discharging is performed is provided.

In addition, with the input device 100 according to the present embodiment, measurement can be performed just by reversing the polarity (the direction of voltage) of the driving voltage supplied to the voltage divider circuits 220. A difference between an output when the first driving voltage is applied and an output when the second driving voltage is applied can be accurately detected without increasing the power supply voltage. Moreover, since the polarity is reversed with the same power supply voltage, measurement errors due to variation in the driving voltage can be reduced.

The first and second driving voltages alternately applied to both ends (first and second nodes 221 and 222) of the voltage divider circuits 220 are not limited to the above example. In another embodiment of the present invention, two different voltage levels may be used for the first and second driving voltages without using the ground potential (GND) for one of the two. In this case, the first and second driving voltages are alternately supplied to change the divider voltage, and the charge of the capacitors 230 changes in accordance with the changes in the divider voltage. The amount of change in the charge of the capacitors 230 depends on the resistance of the resistive sensor device 132, that is, the pressure applied to the board 120. A measurement value of the pressure applied to the board 120, therefore, can be obtained on the basis of the amount of change in the charge of the capacitors 230 each time the driving voltage switches.

Furthermore, with the input device 100 according to the present embodiment, the charge detection circuits are used for both the detection of a position performed by the capacitive sensor unit 320 and the detection of pressure performed by the resistive sensor device 132, and the circuit configuration can be easily integrated and simplified. In addition, since both the first driving circuit 210 and the second driving circuit 310 are integrated on the image information storage section 123, the circuit configuration can be simplified, and the number of components mounted on the board 120 can be reduced. In addition, since both the first charge detection circuits 240 and the second charge detection circuit 330 are integrated on the image information storage section 123, the circuit configuration can be further simplified, and the number of components mounted on the board 120 can be further reduced.

The present invention is not limited to the above embodiments. That is, those skilled in the art may perform modification, combination, sub-combination, and substitution on the above-described components according to the embodiments in various ways without deviating from the technical scope of the present invention or its equivalent scope.

The present invention can be used for an input device that inputs in accordance with changes in pressure of a pressing operation.

What is claimed is:

1. An input device comprising:
a voltage divider circuit that includes a resistive sensor whose resistance changes in accordance with a change in pressure of a pressing operation and at least one resistor device and that, upon receiving driving voltage, generates a divider voltage according to the resistance of the resistive sensor device;
a first driving circuit that alternately supplies, to the voltage divider circuit at certain time intervals, a first driving voltage and a second driving voltage for generating different divider voltages;

a capacitor whose charge changes in accordance with a change in the divider voltage;

a first charge detection circuit that detects an amount of change in the charge of the capacitor at a time when the driving voltage changes from the first driving voltage to the second driving voltage and when the driving voltage changes from the second driving voltage to the first driving voltage;

a board;

a capacitive sensor unit that includes a plurality of capacitive sensor devices that are arranged on a surface of the board at different positions and whose capacitances change as an object approaches;

a second driving circuit that supplies driving voltage to the plurality of capacitive sensor devices;

a second charge detection circuit that detects charge accumulated in the plurality of capacitive sensor devices as a result of the supply of the driving voltage performed by the second driving circuit; and a support member that supports the board on a base, wherein the resistance of the resistive sensor device changes in accordance with a change in pressure by which the board is pressed against the base.

2. The input device according to claim 1, wherein the voltage divider circuit includes a pair of nodes to which the driving voltage is suppled, and wherein the first driving circuit connects, when the first driving voltage is to be supplied, one of the pair of nodes to a power supply line and another of the pair of nodes to ground and connects, when the second driving voltage is to be supplied, the one of the pair of nodes to the ground and the other of the pair of nodes to the power supply line.

3. The input device according to claim 1, wherein the voltage divider circuit applies the divider voltage to one end of the capacitor, and wherein the first charge detection circuit includes a charge-transfer capacitor that accumulates charge transferred from another end of the capacitor, an amplifier circuit that amplifies a difference between a voltage at the other end of the capacitor and a reference voltage and that outputs a resultant voltage to the charge-transfer capacitor, and a charge initialization circuit that, after the amplifier circuit outputs a voltage according to charge transferred to the charge-transfer capacitor from the capacitor in accordance with a change in the driving voltage, initializes the charge accumulated in the charge-transfer capacitor before the driving voltage changes again.

4. The input device according to claim 1, wherein both the first and second charge detection circuits are integrated on a semiconductor integrated circuit chip.

5. The input device according to claim 4, wherein both the first and second driving circuits are integrated on the semiconductor integrated circuit chip.

6. A method for driving an input device including a voltage divider circuit that includes a resistive sensor device whose resistance changes in accordance with a change in pressure of a pressing operation and at least one resistor device and that, upon receiving driving voltage, generates a divider voltage according to the resistance of the resistive sensor device and a capacitor whose charge changes in accordance with a change in the divider voltage, the input device having a board and a support member that supports the board on a base, the input device including a plurality of capacitive sensor devices that are arranged on a surface of the board at different positions and whose capacitances change as an object approaches, the method comprising:

changing the driving voltage from a first driving voltage to a second driving voltage;

detecting an amount of change in the charge of the capacitor when the driving voltage changes from the first driving voltage to the second driving voltage;

changing the driving voltage from the second driving voltage to the first driving voltage;

detecting an amount of change in the charge of the capacitor when the driving voltage changes from the second driving voltage to the first driving voltage;

supplying a driving voltage to the plurality of capacitive sensor devices;

detecting charge accumulated in the plurality of capacitive sensor devices as a result of the supply of the driving voltage; and wherein the resistance of the resistive sensor device changes in accordance with a change in pressure by which the board is pressed against the base.

* * * * *